United States Patent [19]

Schell

[11] Patent Number: 4,748,098

[45] Date of Patent: May 31, 1988

[54] EMULSION FOR POST-TREATING PLANOGRAPHIC PRINTING PLATES PREPARED BY ELECTROPHOTOGRAPHIC MEANS AND PROCESS FOR PRODUCING THE PRINTING PLATES

[75] Inventor: Loni Schell, Hofheim, Fed. Rep. of Germany

[73] Assignee: Hoechst Aktiengesellschaft, Fed. Rep. of Germany

[21] Appl. No.: 52,416

[22] Filed: May 21, 1987

[30] Foreign Application Priority Data

May 21, 1986 [DE] Fed. Rep. of Germany ....... 3617077

[51] Int. Cl.[4] ........................ G03G 13/28; B01J 13/00

[52] U.S. Cl. ...................................... 430/49; 430/331; 430/97; 106/2; 252/308; 252/309

[58] Field of Search .................... 430/49, 97, 125, 331; 106/2; 252/308, 309, 312

[56] References Cited

U.S. PATENT DOCUMENTS

| | | | |
|---|---|---|---|
| 3,158,476 | 11/1964 | Uhlig | 430/60 |
| 3,276,868 | 10/1966 | Uhlig | 430/60 |
| 4,063,948 | 12/1977 | Lind | 430/76 |
| 4,153,461 | 8/1979 | Berghauser | 430/161 X |
| 4,265,999 | 5/1987 | Schell | 430/331 X |
| 4,388,391 | 6/1983 | Schell | 430/49 |
| 4,530,897 | 7/1985 | Berghaeuser et al. | 430/302 |

FOREIGN PATENT DOCUMENTS

| | | |
|---|---|---|
| 1465927 | 4/1974 | Fed. Rep. of Germany . |
| 944126 | 12/1963 | United Kingdom . |

*Primary Examiner*—J. David Welsh

*Attorney, Agent, or Firm*—Foley & Lardner, Schwartz, Jeffery, Schwaab, Mack, Blumenthal & Evans

[57] ABSTRACT

An emulsion for post-treating planographic printing plates prepared by electrographic means can be used to improve the print quality of treated plates. The emulsion comprises (i) about 25% to 60% by weight of an aqueous phase comprising a phosphonic acid compound and a water-soluble hydrophilizing polymer and (ii) about 40% to 75% by weight of an organic solvent phase comprising a hydrocarbon mixture containing at least 20% by weight of aromatic components. A process for the production of planographic printing plates that employs this emulsion is simplified and less costly than conventional processes, and entails fewer environmental hazards.

12 Claims, No Drawings

EMULSION FOR POST-TREATING PLANOGRAPHIC PRINTING PLATES PREPARED BY ELECTROPHOTOGRAPHIC MEANS AND PROCESS FOR PRODUCING THE PRINTING PLATES

BACKGROUND OF THE INVENTION

The present invention relates to an emulsion for post-treating planographic printing plates prepared by electrophotographic means, in order to improve the print quality. The present invention also relates to a process for producing printing plates, employing the aforesaid emulsion.

Electrophotographic processes for producing printing plates are generally known to the art and are described, for example, in German Auslegeschrift No. 11 17 391 (equivalent to British Patent No. 944,126); German Auslegeschrift No. 23 22 047 (equivalent to British Patent No. 1,465,927); and German Patent No. 25 26 720 (equivalent to U.S. Pat. No. 4,063,948).

The basic principle of these electrophotographic methods comprises charging and imagewise exposing a photoconductor layer, which has been applied to an electrically conductive layer support; developing the image by means of dry or liquid toner; fixing the resulting toner image by heating; and decoating the printing plate by removing the unprotected, image-free areas of the photoconductor layer. The toner image areas of the resulting offset printing plate are ink-receptive, whereas the bared areas of the support surface are water-receptive.

It has been stated that—in particular in relatively large, coherent, full shade areas, but also in halftone areas—printing plates prepared in this way tend to have some places where the printing ink is transferred non-homogeneously. A search for the cause of this undesirable phenomenon indicated that the toner, which usually contains a resin that is soluble in organic solvents, starts to swell when it remains in contact with the printing ink over a prolonged period. As a result the toner gets tacky and is able to retain dust and dirt particles, or may form an irregular, wrinkled surface.

U.S. Pat. No. 3,158,476 has disclosed a process for increasing the print run of fixed electrophotographic printing plates, the image-free areas of which are hydrophilic, by (1) coating the image-free, decoated areas with aqueous colloidal substances and, after the coating has dried, (2) treating the printing plate surface with a lacquer containing organic solvents. The laquer treatment dissolves the fixed toner image and the underlying photoconductive layer, and the lacquer firmly attaches to the layer support image only in these image areas. The plate is thereafter treated with water, whereby the coating is removed again from the image-free areas. It is not possible to use this process, however, to produce printing plates that meet present-day standards, for the screen dots are enlarged by the applied lacquer coating; as a consequence, the tone values of the original cannot be reproduced truly. Moreover, the described process is quite complicated and expensive.

It is also known to coat those areas of the layer support, which have been bared by the decoating step, with a solution containing (i) a film-forming polymer, which is soluble in water and insoluble in hydrocarbon solvents, and (ii) a vinylphosphonic acid compound. The solution is then allowed to dry, so that a uniform coating is obtained, and the toner is removed from the photoconductor layer by washing with a hydrocarbon mixture comprising an aromatic proportion of at least 20%.

This process requires a considerable number of different process steps for the production of a plate which is ready for printing. For example, the decoating step must be followed by rinsing, finishing and drying; thereafter, the toner-removing solution must be applied, rubbed in and removed with the aid of a blade, which step is followed by renewing rinsing with water, applying a finishing solution and drying. Seven different process steps are necessary to perform this process; this renders the printing plate production technically complicated, time-consuming and, thus, cost-intensive.

SUMMARY OF THE INVENTION

It is therefore an object of the present invention to provide an emulsion for post-treating planographic printing plates which have been produced by electrophotographic means, the use of which emulsion avoids defects in the full-shade areas occurring as a result of swelling and damaging of the toner by printing ink when the printing process is started.

It is also an object of the present invention to provide a process for the production of planographic printing plates by electrophotomechanic means in which the number of process steps is markedly reduced, achieving savings in time and cost, and in which environmental problems are reduced as a result of employing lesser amounts of organic solvents.

In accomplishing the foregoing objects, there has been provided, in accordance with one aspect of the present invention, an emulsion for post-treating planographic printing plates prepared by electrophotographic means, comprising (A) between about 25% and 60% by weight of an aqueous phase comprised of a phosphonic acid compound and a water-soluble, hydrophilizing polymer and (b) between about 40% and 75% by weight of an organic solvent phase comprised of a hydrocarbon mixture containing at least 20% by weight of aromatic components. In a preferred embodiment, the aromatic components of the hydrocarbon mixture in the organic solvent phase comprise at least one from the group consisting of an alkyl-substituted benzene series compound have 8 to 18 carbon atoms and a higher naphtha compound.

There has also been provided, in accordance with another aspect of the present invention, a process for producing, by electrophotographic means, a printing plate comprised of an electrically conductive support and a photoconductive layer applied to the support, comprising the steps of (A) charging the photoconductive layer; (B) imagewise exposing the photoconductive layer to actinic radiation; (C) thereafter developing the photoconductive layer with liquid or dry toner, whereby a toner image is formed; (D) fixing the toner image by heating; (E) decoating the toner-free non-image areas with an alkali-containing solution, so that the electrically conductive support is bared; and then (F) treating the toner-bearing photoconductive layer areas with an emulsion as described above, so that the toner is removed from the photoconductive layer which represents the image areas.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

In general, the present invention makes possible the removal of toner prior to printing in the course of the processing of a printing plate produced by electrophotographic means. The present invention also makes it possible to dispense with the application of conventional coatings of film-forming, water-soluble polymers prior to removal of the toner. Furthermore, the dot reproduction quality is improved, because an increase of the dot size, which can be caused by the toner, is avoided.

A considerable advantage of the present invention resides in the fact that the above-described emulsion contains only about half the amount of solvent required in conventional toner-removal processes that employ solvents. This results in important economies in the printing plate production. Moreover, the emulsion provides for considerable environmental relief. The emulsion of the present invention generally contains 25 to 60% of an aqueous phase. Particularly favorable results are achieved when the aqueous phase comprises about 30% to 50% of the emulsion.

The phosphonic acid compound can be present in the emulsion of the present invention in concentrations of 0.05% to 10%, preferably 0.2% to 4%. Examples of phosphonic acid compounds that can be used in the emulsion of the present invention include vinylphosphonic acid, polyvinylphosphonic acid, vinylphosphonic acid monomethyl ester, aminotris-methylenephosphonic acid and diethylenetriamine-penta-(methylenephosphonic acid). Other suitable compounds are described in German Patent No. 11 34 093. Preference is given to polyvinylphosphonic acid and aminomethylenephosphonic acids.

Water-soluble, film-forming polymers, such as gum arabic, dextrin or polyvinyl alcohol, can be among the additional constituents of the aqueous phase in an emulsion within the present invention. The concentration of such polymers in the aqueous phase in general varies between 5% and 30%, preferably between 10 and 20%.

Commercially available, technical-grade mixtures that contains at least 20%, preferably 70% to 100%, of aromatic components, can be employed as hydrocarbon mixtures in the organic phase of the emulsion of the present invention. Particularly suitable are higher-boiling homologues of benzene, i.e., alkyl-substituted benzene series compounds (aromatic hydrocarbons and homologues of benzene) having about 8 to 15 carbon atoms, particularly 9 to 13 carbon atoms, and higher naphtha compounds. The proportion of components, such as trimethyl benzene and propyl benzene, which represent health hazards should be kept as low as possible, and the flash point of the mixture should be above 40° C. Suitable non-aromatic constituents include, for example, other higher-boiling hydrocarbons, in particular cycloaliphatic compounds.

The density of a hydrocarbon mixture is in the present invention is typically in the range of about 0.85 to 0.95 g/cm$^3$ at a temperature of 12° C., determined according to DIN 51 757, and the boiling temperature is in the range of about 150° C. to 280° C. The kauri butanol value, measured according to ASTM D-1133, generally varies between about 70 and 100.

The emulsion of the present invention can also contain emulsifiers, anti-foam agents and other substances conventionally employed in printing plate production. Particularly suitable emulsifiers are polyglycol ethers.

The present invention will be explained in greater detail by reference to the following, illustrative examples. In these examples, as in the present description generally, percentages denote percent-by-weight, unless otherwise specified.

EXAMPLE 1

A 300 μm thick layer support of electrolytically grained and anodically oxidized aluminum, which had been pretreated with a 0.1% strength aqueous solution of polyvinylphosphonic acid, was coated with a solution of 40 p.b.w. (parts by weight) of 2-vinyl-4-(2-chlorophenyl)-5-(4-diethylaminophenyl)-oxazole,
47 p.b.w. of a copolymer of styrene and maleic acid anhydride,
10 p.b.w. of a chlorinated rubber and
0.2 p.b.w. of Rhodamine FB (C.I. 45,170), in
510 p.b.w. of tetrahydrofuran,
330 p.b.w. of ethylene glycol monomethyl ether and
150 p.b.w. of butyl acetate.

The coating was then dried so that a uniform photoconductor layer having a weight of 5 g/m$^2$ was obtained.

The plate was charged to −450 V via a corona and then imagewise exposed for 25 seconds, using a reprographic camera equipped with 8 Autophot lamps of 500 W each. The resulting charge image was developed with a toner powder containing 18 p.b.w. of a copolymer of 35% of n-butyl methacrylate and 65% of styrene and
2 p.b.w. of carbon black pigment.

The toner image was fixed by shortly heating the plate to 170° C. to 180° C. The photoconductor layer was removed from the non-image areas by treatment with a solution of 12 p.b.w. of diethylene glycol monoethyl ether,
10 p.b.w. of n-propanol,
1.4 p.b.w. of sodium metasilicate nonahydrate and
76.6 p.b.w. of water, followed by rinsing with water.

An emulsion was thereafter applied that had been prepared from 5.9 p.b.w. of gum arabic,
2.0 p.b.w. of polyvinylphosphonic acid,
31.4 p.b.w. of water,
0.7 p.b.w. of emulsifier WS from BAYER AG (=aryl polyglycol ether)
60 p.b.w. of a hydrocarbon mixture comprising
  2 p.b.w. of BP Supersol M, and
  1 p.b.w. of white spirit having a boiling range of 180° to 210 ° C., by dissolving the emulsifier in the initially-introduced aqueous phase and then slowly adding the hydrocarbon mixture with vigorous stirring (about 1,000 rpm). The printing plate was wiped with the emulsion thus obtained (manually or in an appropriate apparatus). In the course of this treatment the toner dissolved and could be removed from the plate with the aid of a blade or rollers. The remaining thin layer of gum arabic could be left on the plate if the letter were used immediately for printing.

EXAMPLE 2

The procedure employed was the same as in Example 1, except that the toner was removed with an emulsion of 7.9 p.b.w. of gum arabic,
3.0 p.b.w. of aminotris-methylenephosphonic acid,
28.4 p.b.w. of water,
0.7 p.b.w. of emulsifier WS
60 p.b.w. of a hydrocarbon mixture comprising
 2 p.b.w. of a hydrocarbon A(*) with a high content of aromatic components, and
 1 p.b.w. of white spirit having a boiling range of 180° C. to 210° C.

Instead of this hydrocarbon mixture A, it was also possible to use a hydrocarbon B (**) with a high content of aromatic components. The quality of the prints obtained from the printing forms treated in accordance with the present invention is very good, even in relatively large, coherent full shade areas.

(*,**) The hydrocarbons A and B have the following characteristic data:

| | A | B |
|---|---|---|
| Density | 0.868, at 15° C. | 0.933, at 12° C. |
| Refractive index | 1.495 | 1.549 |
| Boiling range DIN 51,751 | 162 to 172 | 193 to 276 |
| Evaporation index | 31 | >1000 |
| Flash point DIN 51,755 | 45 | 78 |
| Aromatics content | 99 | 84 |
| Kauri butanol number | 92 | 78 |
| Viscosity | 0.79 | 1.66 |

EXAMPLE 3

The procedure employed was the same as in Example 1, except that the toner was removed with an emulsion of 3.5 p.b.w. of dextrin (yellow potatoe dextrin, completely water-soluble, Ostwald viscosity 2.80, measured at 20° C. in a 4% strength aqueous solution, pH=2.8)
0.4 p.b.w. of glycerol,
0.8 p.b.w. of polyvinylphosphonic acid,
0.4 p.b.w. of emulsifier WS,
33.9 p.b.w. of water, and
61 p.b.w. of a hydrocarbon mixture as described in Example 2.

What is claimed is:

1. An emulsion for post-treating planographic printing plates prepared by electrophotographic means, comprising (A) between about 25% to 60% by weight of an aqueous phase comprised of a phosphonic acid compound and a water-soluble, hydrophilizing polymer and (B) between about 40% and 75% by weight of an organic solvent phase comprised of a hydrocarbon mixture containing at least 20% by weight of aromatic components.

2. An emulsion as claimed in claim 1, wherein said aqueous phase is present in an amount of between about 30% and 50% by weight, and said organic solvent phase is present in an amount of between about 70% and 50% by weight.

3. An emulsion as claimed in claim 1, wherein said phosphonic acid compound is present in an amount of between about 0.05% and 10.0% by weight.

4. An emulsion as claimed in claim 3, wherein said phosphonic acid compound is present in an amount of between about 0.2% and 4.0% by weight.

5. An emulsion as claimed in claim 1, wherein said water-soluble, hydrophilizing polymer is present in said aqueous phase in an amount of between about 5% and 30% by weight.

6. An emulsion as claimed in claim 5, wherein said water-soluble, hydrophilizing polymer is present in said aqueous phase in an amount of between about 10% and 20% by weight.

7. An emulsion as claimed in claim 1, wherein said aromatic components comprise at least one from the group of alkyl-substituted benzene series compounds having 8 to 15 carbon atoms and higher naphtha compounds.

8. An emulsion as claimed in claim 7, wherein said hydrocarbon mixture has a flashpoint higher than 40° C. and a boiling range between about 150° C. and 280° C.

9. An emulsion as claimed in claim 1, further comprising at least one of an emulsifier and an anti-foam agent.

10. A process for producing, by electrophotographic means, a printing plate comprised of an electrically conductive support and a photoconductive layer applied to said support, comprising the steps of (A) charging said photoconductive layer; (B) imagewise exposing said photoconductive layer to actinic radiation; (C) thereafter developing said photoconductive layer with liquid or dry toner, whereby a toner image is formed; (D) fixing toner image by heating; (E) decoating said toner-free non-image areas of said photoconductor layer with an alkali-containing solution, so that said electrically conductive support is bared; and then (F) treating the toner-bearing photoconductive layer areas with an emulsion as described above, so that the toner is removed.

11. A process as claimed in claim 10, wherein said printing plate comprises an aluminum or aluminum alloy support.

12. A process as claimed in claim 11, wherein said support is comprised of electrolytically grained and anodically oxidized aluminum.

* * * * *